Oct. 3, 1961 T. C. RUND 3,003,085
BY-PASS AND DISCONNECT FACILITIES FOR SOCKET TYPE METERS
Filed March 11, 1958 6 Sheets-Sheet 1

INVENTOR.
Thomas C. Rund
BY
Jones, Darbor Robertson
Attys.

Oct. 3, 1961  T. C. RUND  3,003,085
BY-PASS AND DISCONNECT FACILITIES FOR SOCKET TYPE METERS
Filed March 11, 1958  6 Sheets-Sheet 2
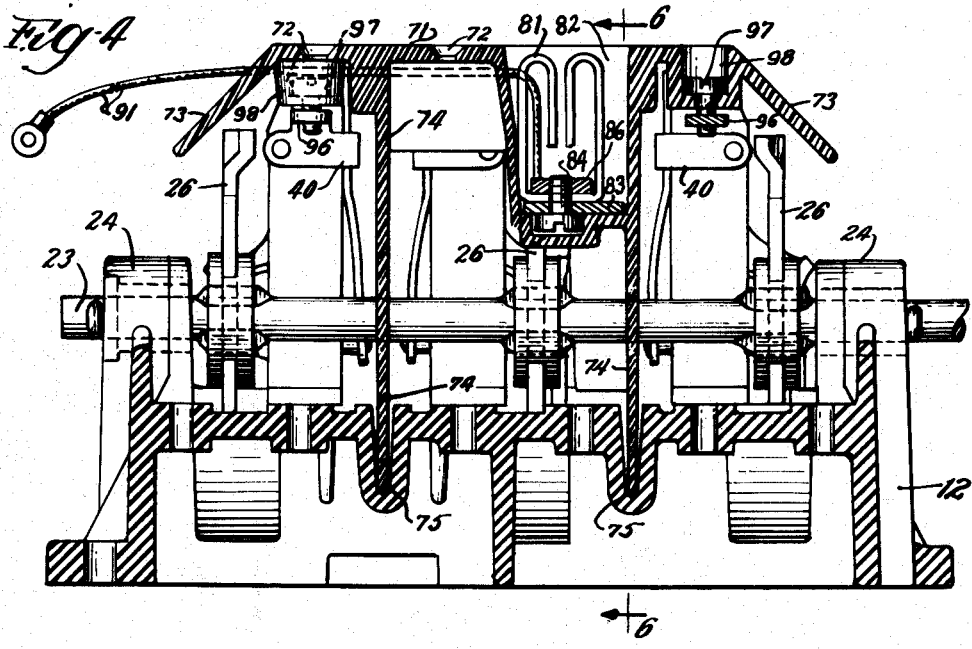
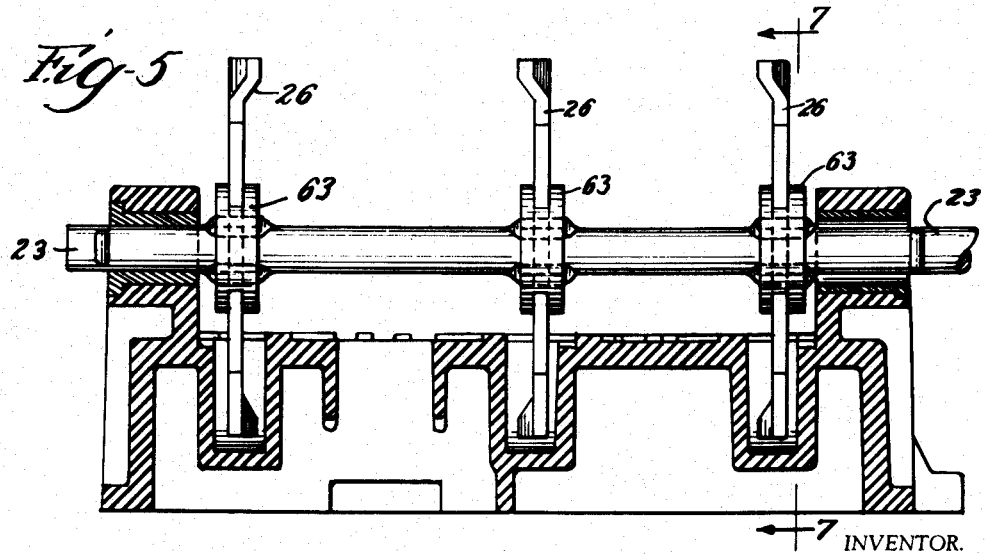
INVENTOR.
Thomas C. Rund
BY
Jones, Darbo & Robertson
Attys.

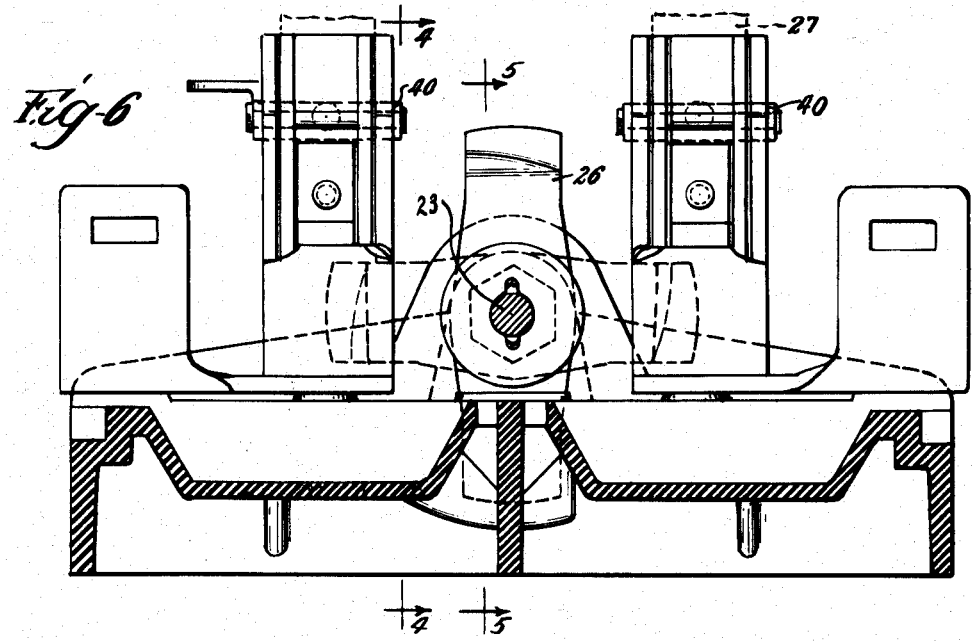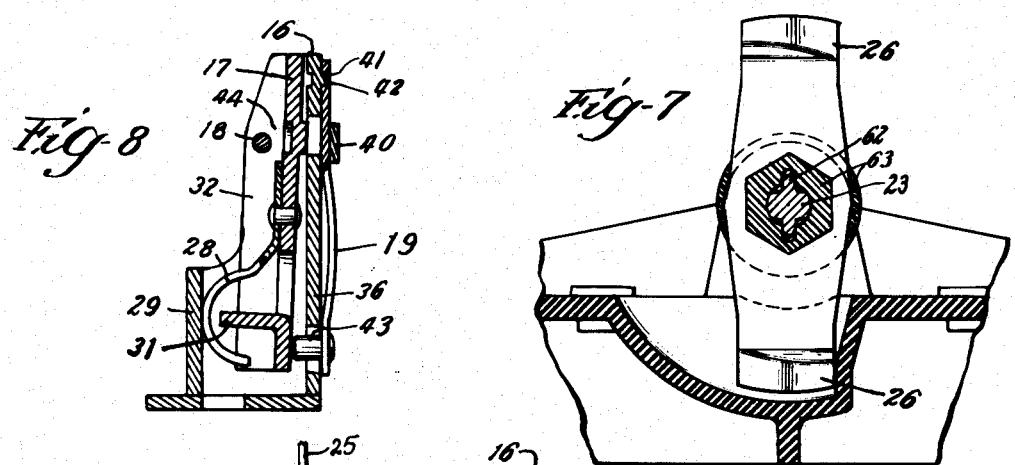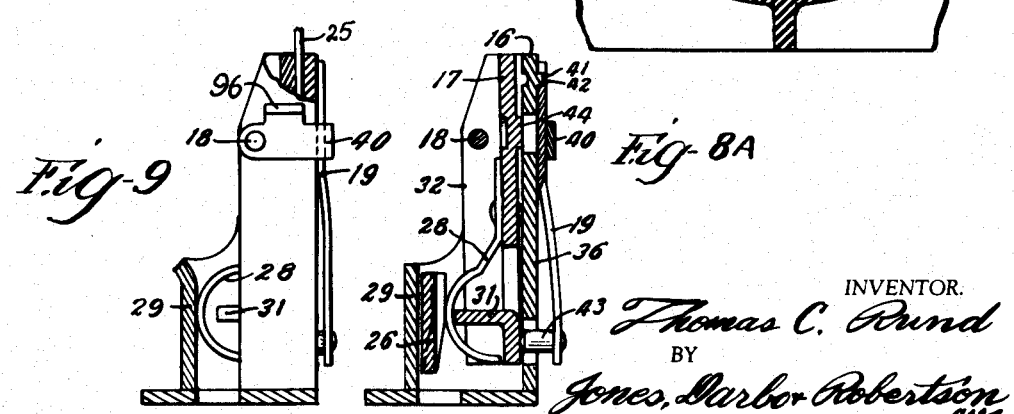

Oct. 3, 1961 T. C. RUND 3,003,085
BY-PASS AND DISCONNECT FACILITIES FOR SOCKET TYPE METERS
Filed March 11, 1958 6 Sheets-Sheet 4
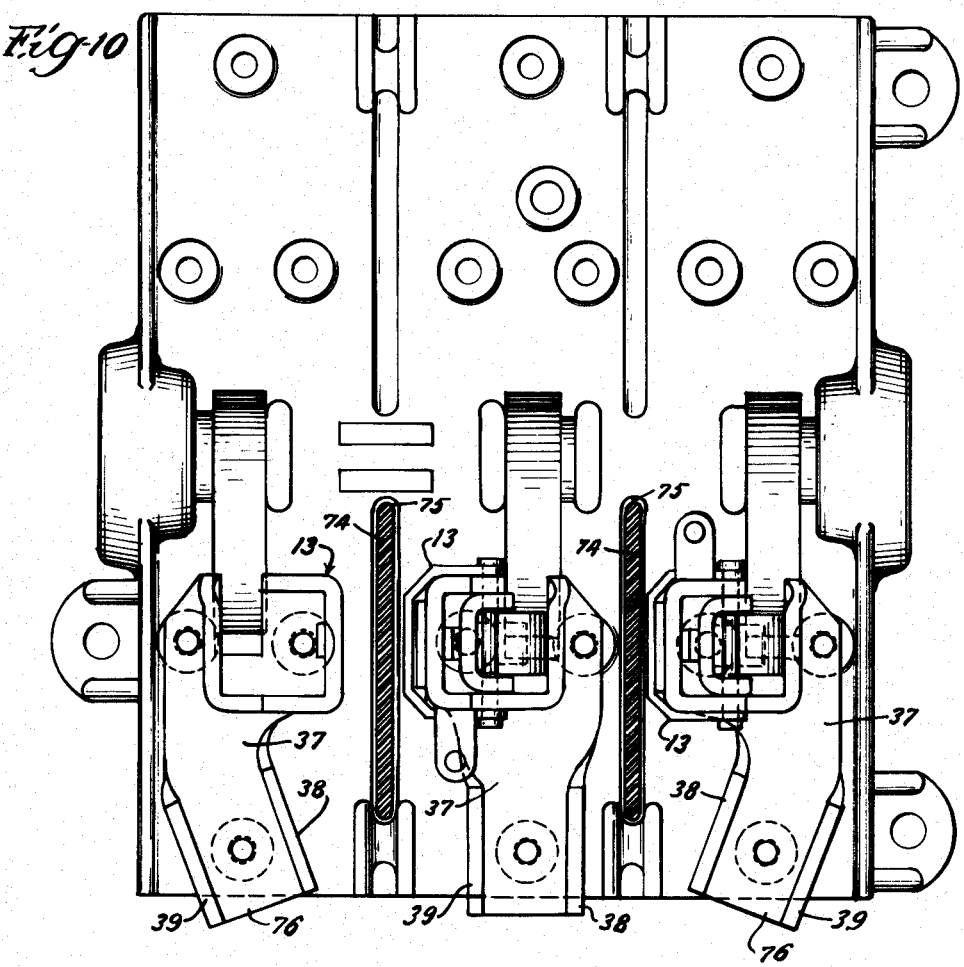
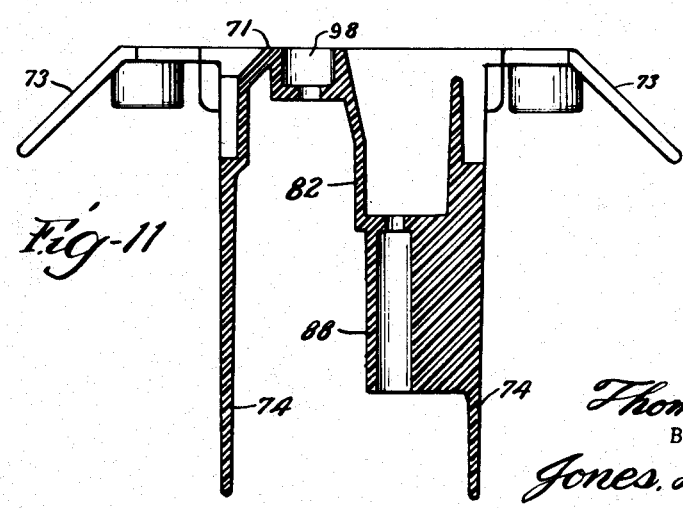
INVENTOR.
Thomas C. Rund
BY
Jones, Garbo+Robertson
Attys Oct. 3, 1961 T. C. RUND 3,003,085
BY-PASS AND DISCONNECT FACILITIES FOR SOCKET TYPE METERS
Filed March 11, 1958 6 Sheets-Sheet 5

INVENTOR.
Thomas C. Rund
BY
Jones, Darbo & Robertson
Attys.

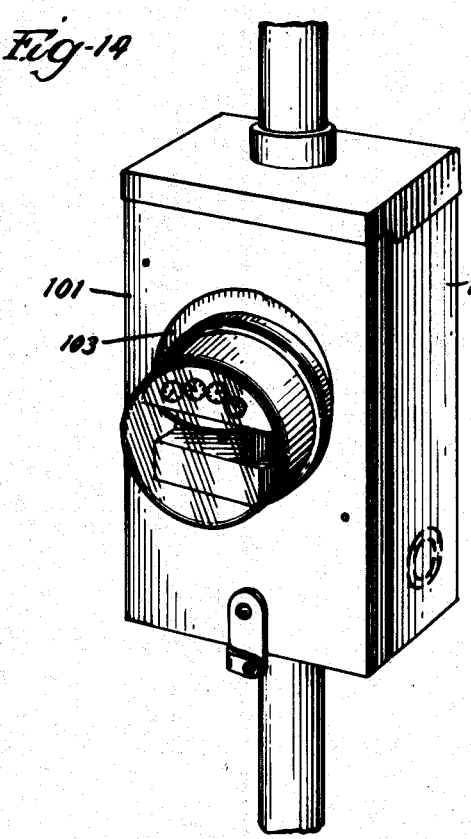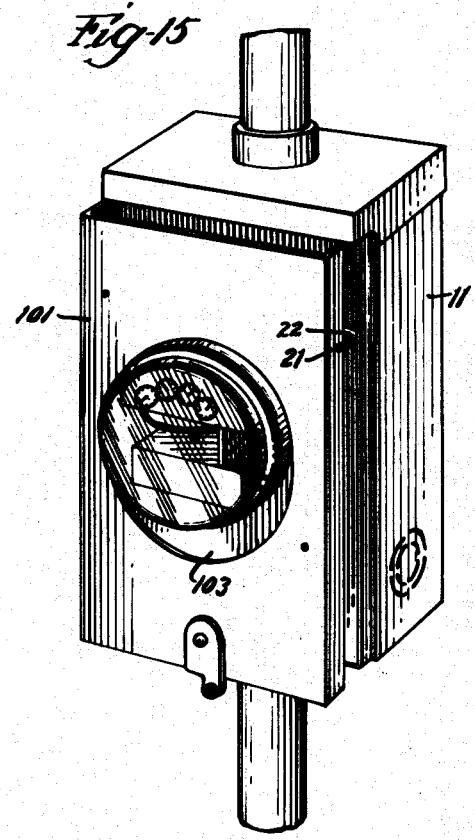

United States Patent Office 3,003,085
Patented Oct. 3, 1961

3,003,085
BY-PASS AND DISCONNECT FACILITIES FOR SOCKET TYPE METERS
Thomas C. Rund, Lafayette, Ind., assignor to Duncan Electric Company, Inc., Lafayette, Ind., a corporation of Indiana
Filed Mar. 11, 1958, Ser. No. 720,693
11 Claims. (Cl. 317—107)

It is desirable to be able to remove a watt-hour meter (an electricity meter for measuring the kilowatt hours consumed by a power customer) without interruption of the electric service which it measures. The most popular type of watt-hour meter is known as the socket type. A more descriptive term for it would be "plug in." It has terminal blades exposed on the back so that the meter can be thrust into a suitable socket and will thereby be connected in the circuit. Various means have been suggested in the past for establishing by-pass connections for removal of the meter, so that removal of the meter would not interrupt the service.

The by-pass facilities have perhaps been fairly satisfactory and easy to use at ordinary loads. However, heavy duty meters and connection facilities are becoming more and more common, and these present both special problems and the exceptionally great need to avoid interruption of service. The physical nature of the heavy duty connections is enough different from that used in ordinary service so that the mere application of old by-pass facilities to these connecting facilities would at least require substantial redesigning. However, even the application of such old type by-pass facilities would not result in a satisfactory installation, because of the heavy current loads involved and special requirements which result.

The heavy current loads require great efforts to avoid the generation of heat due to resistance and to dissipate heat unavoidably generated in the meter by conduction through the current conductors leading to the meter. To aid in solving this heat problem, the connecting facilities are made quite heavy in cross section and the clamping pressure with which they engage the terminal blades of the meter is made higher than that deemed sufficient in connection with ordinary loads. This high clamping pressure must be released before it is practical to withdraw the meter.

Heretofore the best facilities for a heavy duty meter required separate by-pass connectors, one connecting the jaws of each pair of jaws, each by-pass being applied in the form of a separate hand-operated by-pass tool. Thereafter four or six jaws had to be loosened one at a time. Although this has been workable and has been extensively used, it has represented a time-consuming and somewhat annoying operation. And it required some special training of the meter men engaged in the operation.

According to the present invention, the whole job is done by swinging a single lever. It initially establishes all by-pass connections, then by continuation of the same movement releases the jaw pressures on all six jaws so that the meter may easily be withdrawn.

The jaws are urged in the clamping direction by stiff springs, and the springs are released by cam members on a crank which forms the operating lever. Before the cams come into camming position, they engage spring contact members on the respective jaws which establish the by-pass connections and then yield as the cams move into camming relationship with the jaw parts.

Designation of figures

FIG. 4 is a horizontal perspective view through the apparatus of FIG. 1, with a plastic shield in place that had been removed in FIG. 1, the view being taken approximately on the line 4—4 of FIG. 6, and the plastic shield of FIG. 12 being shown in place.

FIG. 5 is a horizontal view showing especially the crank and cams, being taken approximately on the line 5—5 of FIG. 6.

FIG. 6 is a vertical sectional view taken approximately on the line 6—6 of FIG. 4, the plastic shield being omitted.

FIG. 7 is a fragmentary vertical sectional view taken approximately on the line 7—7 of FIG. 5.

FIG. 8 is a vertical sectional detailed view through one of the connecting clamps in its extreme spring-actuated position.

FIG. 8A is a similar view, showing the clamp open.

FIG. 9 is a detailed view of the side of the structure shown in FIG. 8, but with a meter terminal blade being clamped.

FIG. 10 is a front view of the terminal block, its upper half being shown bare, and some parts being shown on its lower half.

FIG. 11 is a horizontal sectional view thru the plastic shield, taken approximately on the line 11—11 of FIG. 13.

FIGS. 14 and 15 show the box with meter in place and with the cover closed and blocked from closing, respectively.

General description

Although the following disclosure offered for public dissemination is detailed to ensure adequacy and aid understanding, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements, or combinations in which the inventive concepts are found.

Figure 1:
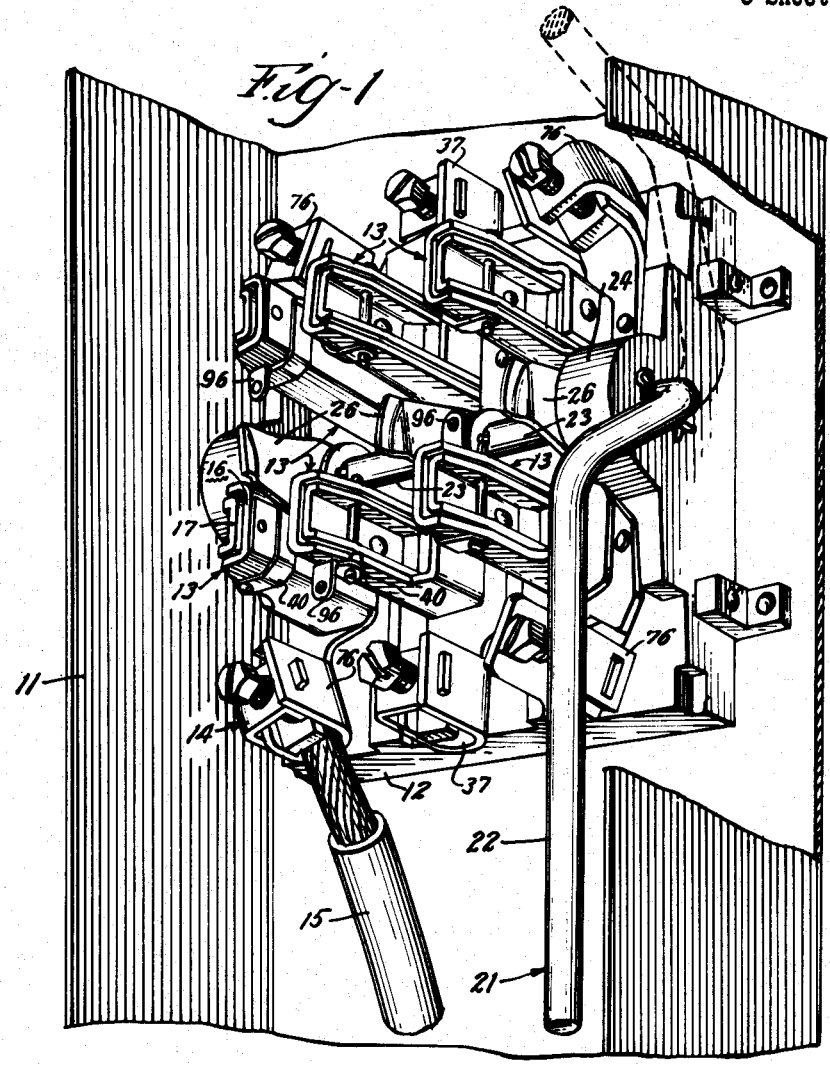
FIG. 1 is a prospective view of the form of the invention chosen for illustration, the terminal block being shown mounted in a box, and the operating handle being shown in dotted lines projecting from the box, to prevent closure of the box with the meter by-passed. A plastic shield is omitted.

As seen in FIG. 1, the terminal block assembly embodying the heart of this invention is mounted in a meter box 11 which is deep enough to house the assembly shown. The terminal block assembly shown includes a terminal mounting block 12 of insulating material on which are carried six clamp and connector assemblies 13. Each such assembly includes a saddle clamp 14 for connection to one of the cables 15 in the circuit being measured. Each assembly 13 also includes a meter blade clamp comprising a fixed jaw 16 and a movable jaw 17.

As seen best in FIG. 8, the lever 32 forming movable jaw 17 at its forward end, is pivoted about a spindle 18 and thrust in closing direction by a sturdy leaf spring 19 pressing on the rear end of lever 32.

A crank 21 having a hand lever 22 and a crank shaft 23 extends through bearing blocks 24 of terminal mounting block 12. It carries three double cams lever 26 which are mounted to turn with crank 23 but are insulated from it. When the crank handle 22 is in the position shown in full lines in FIG. 1, extending downwardly and lying within the box 11, spring 19 urges the parts shown in FIG. 8 toward the position there shown. When a meter is in place, however, a blade 25 will be squeezed between the jaws 16 and 17 as shown in FIG. 9.

When the crank handle 22 is swung outwardly and upwardly toward the position shown in dotted lines in FIG. 1, it turns double cams 26. The cam ends first wedge between back plates 29 and springs 28 which ensure a pressure contact. In this position, each double cam connects a pair of clamp assemblies 13. If the three incoming service cables are connected to the terminal block at its top, double cam 26 forms a by-pass connection from each to the corresponding load cable connected to the terminal block assembly at its bottom. Thus the connections are made independently of the meter and the meter, if present, is by-passed.

As the crank lever 22 is swung further upwardly, spring contacts 28 are flexed against lugs 31 as seen in FIG. 8A, and the rear end of lever 32 forming jaw 17 at its outer end is rocked away from back plate 29 to rock clamp jaw 17 away from clamp jaw 16. This releases the meter blade which had been clamped between these jaws as seen in FIG. 9. The meter may now be withdrawn or another meter inserted.

While the crank handle 32 is in the dotted line position, it projects forwardly from the box 11 and prevents the cover normally applied to the box 11 from being restored. This is a safeguard against leaving the by-pass connections in place inadvertently. It does not lie within box 11 until the by-pass connections have all been separated.

When the meter or a new meter has been inserted, the crank lever 22 is drawn downwardly. This first releases the clamp lever 32 so that the clamps 17 firmly grip the blades of the meter. At this stage, however, the cams 26 are still connecting the clamp assembly pairs. Further movement of the crank lever 22 to its full line position shown in FIG. 1 turns the cams 26 out of contact and leaves the meter connected in the circuit.

Clamp assembly details

Figure 2:
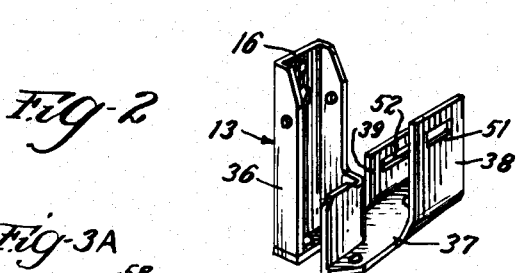
FIGS. 2 and 3 are perspective views of two of the fittings shown in FIG. 1, the part shown in FIG. 3 co-operating with that shown in FIG. 2.

Each clamp assembly 13 includes one part made up as seen in FIG. 2. This is made from two pieces of heavy sheet copper properly formed and then brazed together. One piece comprises the box-like leg 36 which forms the stationary clamp member 16 at its upper end. The other piece comprises the base 37 which is brazed to the bottom of leg 36 and at its other end includes the upstanding legs 38 and 39 forming parts of the cable clamps 14. To ensure extremely low resistance, the surfaces of the joining end of leg 36 are preferably machined reasonably accurately to a plane and brazed all along their junction with with the base plate 37, the silver solder of the brazing seeping between the two and making an extremely low resistance and strong joint.

Contact pressure springs 28 may be riveted to levers 32 as clearly seen in FIG. 8.

Leaf springs 19 are secured in position by straps 40 which are held in place by spindles 18. Each spring 19 may be provided with a small hole 41 which fits over a lug 42 formed in jaw 16.

A pressure pin 43 may be riveted to the bottom of leaf spring 19 for extending through leg 36 to press on the back end of lever 32.

A pad 44 is preferably pressed out of lever 32 at the base of jaw 17 to limit the extent of movement of terminal blades into the space between the jaws.

Because of the sturdiness of spring 19 and the great length of lever 32 rearwardly of spindle 18 compared to its length forwardly of spindle 18, very great pressure is applied to the blades.

Cable clamps

Although other styles of cable clamps than those shown may be used, those shown are preferred because of their simplicity of use combined with high strength and the ability to provide high clamping pressure on the service cable. Leg 38 seen in FIG. 2 is provided with a rectangular aperture 51. Shorter leg 39 is provided with another rectangular aperture 52. An L-shaped saddle member 53 is provided with an end lug 54 adapted to fit in the hole 51 and a coined lug 56 adapted to fit in the hole 52. Each of these lugs, or at least lug 54, has its outer surface extending slightly outwardly around an edge of the hole in the direction of counterthrust when screw 59 is tightened. As a result, saddle member 53 holds itself in the holes as the cable-clamping pressure is applied.

Figure 3A:
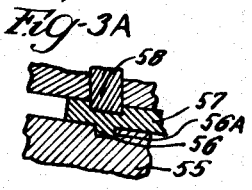
FIG. 3A shows the coining of the part shown in FIG. 3.

The out-turning of lug 54 is accomplished by ordinary shaping methods, preferably forming a lip at its end, but the out-turning of lug 56 may not be as obviously accomplished. It can be accomplished, however, by a special coining operation. The recess 56A of the coining die 55 (FIG. 3A) which forms lug 56 cannot be thicker at its base than at its entrance or lug 56 could not be removed. However this recess can lie at an angle to the face of the coining die. For example, satisfactory results have been obtained by a slight sloping of the face of the die 55 on which the leg 57 rests, the recess 56A and the stroke of the plunger 58 being vertical. Whether or not the face of die 55 is sloped, the deforming die plunger 58 is preferably larger in cross section than the cross section of lug 56 to minimize the rupturing of the leg 57 as the lug 56 is formed. Surprisingly, the forces are such as to hold lug 56 firmly in place after screw 59 has been tightened, even if the load-bearing face 56' of lug 56 is perpendicular to leg 57, provided that saddle member 53 is stiff (as 3/16" CR steel). The outward sloping of face 56' with a hooking action is helpful to resist the torque resulting while screw 53 is being tightened, and provides a safety factor.

Clamping screw 59 is threaded to the outer leg or bar of saddle clamp 53 and preferably is pivoted to a sturdy spring clamp plate 61 which is humped in its middle so its ends will maintain firm contact with the cable in spite of minor variations such as contraction due to cold.

Crank and cam construction

Crank 23 may be round bar with ears 62 formed on it as seen in FIG. 7. The ears may be pinched out. The rod is separated from each cam blade 26 by an insulating hub 63.

Insulating shield

To protect both the metermen and the equipment, it is desirable to provide insulating shields over the terminal block assembly shown in FIG. 1 so that there will be no danger that as a meter is applied it will come in contact with the wrong parts and so that it will be almost impossible for even a careless handler to get a shock. A suitable insulating shield is seen best in FIGS. 4, 11, 12 and 13. The shield is provided with a face panel 71, having apertures 72 for the meter blades and having wings 73 which, as seen best in FIG. 4 extend laterally and rearwardly (downwardly in FIG. 4) to make the electrical parts relatively inaccessible. The material at present preferred for the shield is a transparent plastic.

Figure 3:
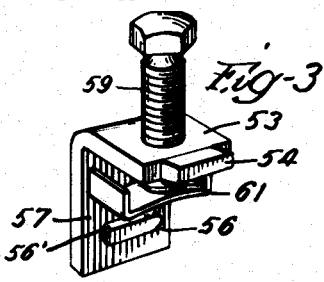

As seen best in FIGS. 4 and 10, the insulating shield also preferably is provided with leg or divider panels 74 which extend into recesses 75 in the terminal mounting block 12. These greatly increase the spark-over distance between adjacent clamp assemblies 13. As seen in FIG. 10, the adjacent assemblies 13 extend considerably closer to one another in the vicinity where they are separated by insulating legs 74 than elsewhere. One of the advantages of the new type of saddle clamp shown in FIGS. 2 and 3 is that it is relatively narrow. Hence the spacing between them is satisfactory. This is true even though, as may be observed from FIG. 10, the two side conductor clamp portions 76 are disposed at angles. This angular disposition is desired so that the heavy cables coming in at the center of the box can more readily be flexed to lie in the cradles formed between the respective legs 38 and 39.

Seventh terminal

For some types of service, it is desirable to provide a seventh terminal for the meters. This terminal is a voltage terminal however and it does not carry a heavy current load. Accordingly the terminal need not be of the heavy duty type 13 already described.

Figure 12:
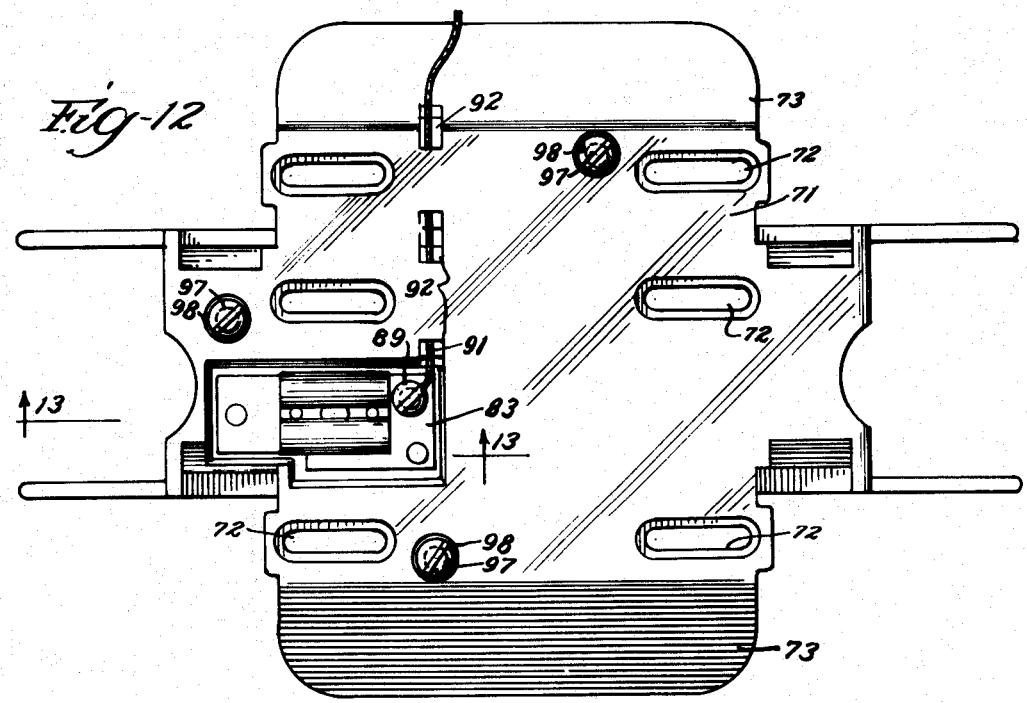
FIG. 12 is a face view of the plastic shield.

According to the present invention, this seventh terminal is provided in conjunction with the plastic insulation shield. The general location of this seventh terminal (a conventional location required to receive the meter blades) is best seen in FIG. 12. The construction is better seen in FIGS. 13 and 4.

Figure 13:
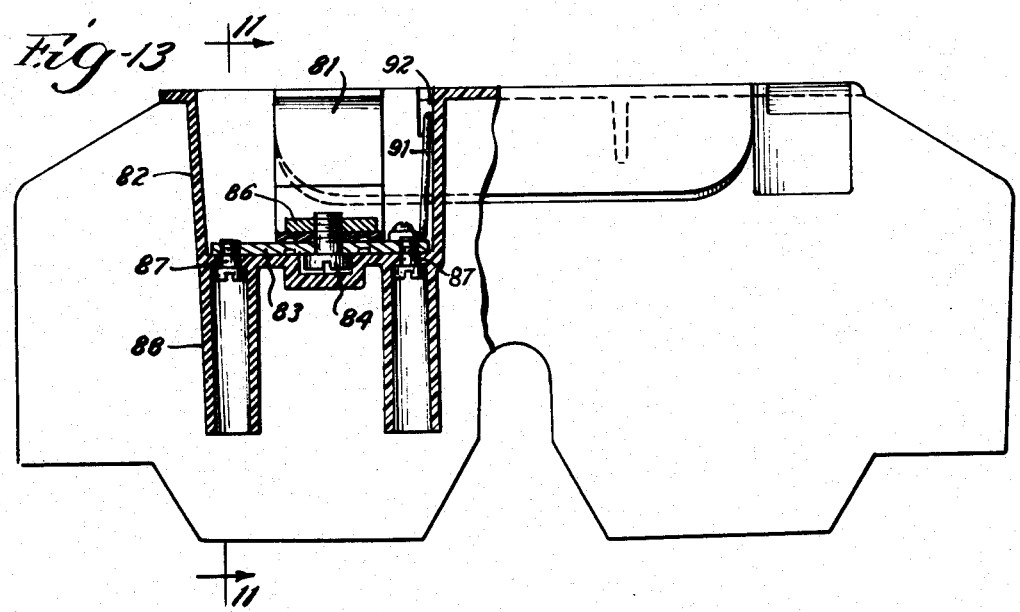
FIG. 13 is a side view of the plastic shield partly broken away to show a section approximately on the line 13—13 of FIG. 12.

As is apparent from FIG. 13, the seventh terminal 81 is provided in a well 82 formed by the plastic material. Terminal clamp 81 is a conventional spring type secured to a base plate 83 by a screw 84 which screws into a nut 86 lying within the spring-like band of terminal clamp 81. This relationship of nut 86 and clamp 81 is best seen in FIG. 4.

After assembly of parts 81, 83, 84 and 86, they are inserted in the well 82 and secured therein by screws 87 which thread into base plate 83. Tubular insulators 88 through which screws 87 are passed extend far down below screws 87 so that there will be no short spark-jumping distance between the screws 87 and the nearest clamp assembly 13. As seen best in FIG. 11, these tubes 88 may be formed integrally with one of the legs 74.

As seen best in FIG. 12, base plate 83 bears a terminal screw 89 onto which is secured the terminal of voltage lead wire 91. This lead wire passes through apertures 92 and extends out from the side of the plastic shield to be connected to a suitable cable clamp in the box 11 but not shown. The seventh terminal 81 and its corresponding lead connection 91 would be required only for four-wire circuits. The lead 91 would be connected to the fourth wire or cable of such a circuit.

Although the spring pressure of seventh terminal 81 is not relieved by a camming action when the crank is operated, this spring pressure is not so great as to make relieving it necessary.

When a five terminal meter is to be used, the two center clamp and connector assemblies 13 may be omitted and replaced by a fifth terminal similar to terminal 81, but mounted on a conductor bar connected at its upper and lower ends to cable clamps 14.

Further details

The plastic shield may be secured in place in any convenient manner. According to the illustrated form, three of the bands 40 are provided with ears 96 receiving screws 97 for which recesses 98 are provided in the plastic shield.

As seen in FIG. 14, box 11 is normally closed by a cover 101. When crank 21 is turned for by-passing and releasing meter 102, crank handle 22 blocks closure of the cover. These figures also illustrates a specially shaped slide 103 in cover 101 for facilitating movement of the cover although sealing the meter when closed.

I claim:

1. A connection block assembly for socket type meters including a plurality of pairs of clamps for receiving the blades of the meter, each clamp including cooperating jaws of which one is spring urged toward the other and provided with an opening lever, a bypass pressure spring connected to each opening lever, a hand crank, a conductive camming means for each pair of clamps insulated from the crank, movable by the crank to engage the pressure springs and the clamps of each pair, and thereafter upon continued movement to actuate said opening lever to open said clamp.

2. A connection block assembly for socket type meters including a plurality of pairs of clamps for receiving the blades of the meter, each clamp including cooperating jaws of which one is spring urged toward the other, an operating handle, and means moved by the operating handle for overcoming the spring pressure to release the clamps; said assembly including means operated by the handle for completing a connection between each pair of clamps before overcoming the spring pressure of either.

3. A connection block assembly for socket type meters including a plurality of pairs of clamps for receiving the blades of the meter, each clamp including cooperating jaws of which one is urged toward the other for normally gripping the blade therebetween, and means mounted in the assembly associated with all of said clamps and including an operating handle for releasing all of the clamps by a single operation of the handle.

4. A meter mounting box having an open front, and a connection block assembly according to the preceding claim in the box; the operating handle lying substantially within the box when at the limit of its movement in one direction, when said jaws are urged in clamping direction, and extending out from the box when said jaws are released, to block application of a cover to said box.

5. A connection block assembly for socket type meters including an insulative base, three pairs of clamp connector units carried thereby, each unit having an outstanding jaw conductor U-shaped in cross section for receiving a blade endwise, a clamping lever lying mainly within the U for clamping the blade against the conductor, a spring urging the lever to clamping position, a conducting plate extending from the base of the jaw conductor having slotted upstanding legs for receiving a service cable between them, a saddle lying snugly adjacent to the legs and having lugs passing into the slots thereof and a screw through its saddle portion for clamping said cable; a shield of insulating material having a face panel in front of said jaw conductors but slotted to permit passage of the meter blades, and divider panels extending between pairs of said units in the vicinity of the jaw conductors and into recesses in said insulative base, an outwardly facing spring terminal carried by said shield in a well formed therein and adapted to receive a potential blade on a meter, a lead wire extending from said spring terminal along said shield for connection to a service conductor other than those cables in said cable clamps, and means within the spaces separated by said divider panels and controllable at will for connecting the two units of each pair and thereafter overcoming the clamping lever springs.

6. A connection block assembly for socket type meters including an insulative base, three pairs of clamp connector units carried thereby, each unit having an outstanding jaw conductor for receiving a blade endwise, a clamping lever for clamping the blade against the conductor, a spring urging the lever to clamping position; a shield of insulating material having a face panel in front of said jaw conductors but slotted to permit passage of the meter blades, and divider panels extending between pairs of said units in the vicinity of the jaw conductors and into recesses in said insulative base, an outwardly facing spring terminal carried by said shield in a well formed therein and adapted to receive a potential blade on a meter, a lead wire extending from said spring terminal along said shield for connection to a service conductor other than those connected to the already designated clamp connector units, and means within the spaces separated by said divider panels and controllable at will for connecting the two units of each pair and thereafter overcoming the clamping lever springs.

7. A connection block assembly for socket type meters including an insulative base, pairs of clamp connector units carried thereby, each unit having an outstanding jaw conductor for receiving a blade endwise, a clamping lever for clamping the blade against the conductor, a spring urging the lever to clamping position, a shield of insulating material having a face panel in front of said jaw conductors but slotted to permit passage of the meter blades, and divider panels extending between pairs of said units in the vicinity of the jaw conductors and into recesses in said insulative base, an outwardly facing spring terminal carried by said shield in a well formed therein and adapted to receive a potential blade on a meter, a lead wire extending from said spring terminal along said shield for connection to a service conductor other than those connected to the already designated connector units.

8. A connection block assembly for socket type meters including an insulative base, pairs of clamp connector units carried thereby, each unit having an outstanding jaw conductor for receiving a blade endwise, a clamping lever for clamping the blade against the conductor, a spring urging the lever to clamping position, a shield of insulating material having a face panel in front of said jaw conductors but slotted to permit passage of the meter blades, and divider panels extending between pairs of said units in the vicinity of the jaw conductors and into recesses in said insulative base, and means within the spaces separated by said divider panels and controllable at will for connecting the two units of each pair and thereafter overcoming the clamping lever springs.

9. A connection block assembly for socket type meters including an insulative base, pairs of clamp connector units carried thereby, each unit having an outstanding jaw conductor for receiving a blade endwise, a clamping lever for clamping the blade against the conductor, a spring urging the lever to clamping position, said insulative base being slotted to receive insulating divider panels slipped in between the pairs of said units in the vicinity of said jaws, and means within the spaces separated by said divider panels and controllable at will for connecting the two units of each pair and thereafter overcoming the camping lever springs.

10. A connection block assembly for socket type meters including a plurality of pairs of clamps for receiving the blades of the meter, each clamp including cooperating jaws, a bypass contact connected to each clamp, a hand crank mounted as part of said assembly for pivoting about a fixed axis, a plurality of mechanically interconnected conductive bypass means, one for each pair of clamps, insulated from the crank, movable by the crank in one operation thereof to engage the contacts, providing bypass connection for the respective pairs of clamps.

11. A meter mounting box having an open front, and a connection block assembly according to claim 10 in the box; the operating handle lying substantially within the box when at the limit of its movement in one direction, when said connections are not completed, and extending out from the box when said connections are completed, to block application of a cover to said box.

References Cited in the file of this patent

UNITED STATES PATENTS

| | | |
|---|---|---|
| Re. 21,148 | Mylius | July 11, 1939 |
| 1,872,298 | Kehoe | Aug. 16, 1932 |
| 1,996,888 | Smythe | Apr. 9, 1935 |
| 2,129,723 | Wood | Sept. 13, 1938 |
| 2,231,737 | Rutter | Feb. 11, 1941 |
| 2,370,043 | Johansson | Feb. 20, 1945 |
| 2,626,309 | Road | Jan. 20, 1953 |
| 2,747,050 | Johansson | May 22, 1956 |
| 2,774,953 | Trier | Dec. 18, 1956 |
| 2,790,951 | Holtz | Apr. 30, 1957 |

FOREIGN PATENTS

| | | |
|---|---|---|
| 288,101 | Italy | Aug. 26, 1931 |
| 503,652 | Canada | June 15, 1954 |